(12) United States Patent
Kambara et al.

(10) Patent No.: US 10,577,241 B2
(45) Date of Patent: Mar. 3, 2020

(54) HYDROGEN GENERATOR

(71) Applicants: Gifu University, Gifu (JP); Sawafuji Electric Co., Ltd., Gunma (JP)

(72) Inventors: Shinji Kambara, Gifu (JP); Tomonori Miura, Gunma (JP)

(73) Assignees: Gifu University, Gifu (JP); Sawafuji Electric Co., Ltd., Gunma (JP)

( * ) Notice: Subject to any disclaimer, the term of this patent is extended or adjusted under 35 U.S.C. 154(b) by 0 days.

(21) Appl. No.: 16/312,487

(22) PCT Filed: Jan. 19, 2018

(86) PCT No.: PCT/JP2018/001596
§ 371 (c)(1),
(2) Date: Dec. 21, 2018

(87) PCT Pub. No.: WO2018/139362
PCT Pub. Date: Aug. 2, 2018

(65) Prior Publication Data
US 2019/0135621 A1    May 9, 2019

(30) Foreign Application Priority Data
Jan. 30, 2017  (JP) ................................ 2017-013841

(51) Int. Cl.
*C01B 3/04* (2006.01)
*H01M 8/0606* (2016.01)
(Continued)

(52) U.S. Cl.
CPC .............. *C01B 3/047* (2013.01); *B01D 53/22* (2013.01); *C01B 3/56* (2013.01); *H01M 8/0606* (2013.01);
(Continued)

(58) Field of Classification Search
CPC .. C01B 3/047; C01B 3/04; C01B 3/56; C01B 3/323; C01B 3/384; C01B 3/505;
(Continued)

(56) References Cited

U.S. PATENT DOCUMENTS

| 3,730,774 A | 5/1973 | McKee et al. |
| 5,811,062 A * | 9/1998 | Wegeng ................. B01B 1/005 422/129 |

(Continued)

FOREIGN PATENT DOCUMENTS

| JP | 2004359508 | 12/2004 |
| JP | 2008536796 | 9/2008 |

(Continued)

*Primary Examiner* — Xiuyu Tai
(74) *Attorney, Agent, or Firm* — Peacock Law P.C.; Janeen Vilven; Justin R. Muehlmeyer

(57) ABSTRACT

Provided is a hydrogen generating apparatus adaptable to fluctuating hydrogen demand, particularly by enabling large-scale hydrogen production, generating pure hydrogen at a high yield. The hydrogen generating apparatus 1 includes a tabular dielectric body 2 having a first surface 11 with a source gas flow channel 13 formed as a recess and a second surface 12 approximately parallel to the first surface 11, a grounding electrode 3, a hydrogen flow channel plate 4 with a hydrogen flow channel 18 and a hydrogen outlet 19, being arranged on a first surface 11 side of dielectric body 2, a hydrogen separation membrane 5 between source gas flow channel 13 and hydrogen flow channel 18, and a high-voltage power supply 6 that causes electric discharge in source gas flow channel 13 between hydrogen separation membrane 5 and grounding electrode 3. Hydrogen separation membrane 5 transmits hydrogen generated by electric discharge in source gas flow channel 13 into hydrogen flow channel 18.

3 Claims, 8 Drawing Sheets

(51) Int. Cl.
  *B01D 53/22* (2006.01)
  *C01B 3/56* (2006.01)
(52) U.S. Cl.
  CPC .... *B01D 2053/222* (2013.01); *B01D 2256/16* (2013.01)
(58) Field of Classification Search
  CPC ...... C01B 2203/0233; C01B 2203/041; C01B 2203/0445; C01B 2203/047; B01D 53/22; B01D 2053/222; B01D 2256/16; H01M 8/06; H01M 8/0606; B01J 19/0093; B01J 19/249; B01J 35/04; B01J 37/0225; B01J 2219/00783; B01J 2219/00822; B01J 2219/00824; B01J 2219/00835; B22C 3/041; Y10T 428/31678; Y02E 60/364; Y02P 20/128; Y02P 20/52
  See application file for complete search history.

(56) References Cited

U.S. PATENT DOCUMENTS

2014/0305790 A1 10/2014 Deveau et al.
2015/0238922 A1* 8/2015 Kambara ................ C01B 3/047
                                                      429/423

FOREIGN PATENT DOCUMENTS

| JP | 2013078716 | 5/2013 |
| JP | 2014070012 | 4/2014 |
| JP | 2017042734 | 3/2017 |

\* cited by examiner

HYDROGEN GENERATOR

FIELD OF THE INVENTION

The present invention relates to a hydrogen generating apparatus capable of generating hydrogen of a high purity at a high yield from a hydrogen source material.

BACKGROUND ART

In order to promote the use of hydrogen as an energy source, there is a need for a low-cost method for supplying hydrogen that is capable of flexible adaptation to changes in the amount of hydrogen to be supplied. One such hydrogen supplying method being considered is an energy carrier system, where a material containing large amounts of hydrogen, such as ammonia, is transported and stored as a hydrogen carrier, and from which hydrogen is generated in accordance with the time of consumption and consumption amount.

A typical apparatus that uses hydrogen as fuel is the fuel cell. Fuel cells require hydrogen of a high purity to run, and the standard for hydrogen purity for fuel cells is currently defined as 99.97% in ISO 14687-2. If hydrogen of a high purity could be efficiently supplied using energy carrier systems, a greater popularization of fuel cells could be expected.

An example of a known method for generating hydrogen is steam reforming of hydrocarbon gas, such as methane. However, steam reforming requires processing at high temperatures using expensive catalysts such as nickel, which makes the production apparatus expensive as a whole. Moreover, when the mole ratio of steam to the carbon contained in the hydrocarbon used as raw material becomes low, coking of the carbon on the catalyst occurs, which deactivates the catalyst. The production conditions must therefore be carefully controlled corresponding to the amount of hydrogen to be produced. Another known method of producing hydrogen is a catalysis method using a precious metal catalyst such as ruthenium to decompose a raw material such as ammonia at a temperature of 400° C. or higher. However, such catalysis methods have a low decomposition rate of the ammonia, and cannot generate hydrogen pure enough for use in fuel cells at a high yield.

In addition, methods for transforming source gas into plasma to generate and separate hydrogen are being considered. Patent Document 1 discloses a hydrogen producing apparatus including a plasma reactor into which a gaseous raw material is introduced, and a nearly cylindrical hydrogen separating/transporting section for separating hydrogen in the plasma reactor and transporting the obtained hydrogen to the outside of the plasma reactor. The outer wall of the plasma reactor also serves as an external electrode. The hydrogen separating/transporting section arranged coaxially with the external electrode is composed of a porous internal electrode and a hydrogen separating film with a thickness of a few ten μm to a few hundred μm coated on an internal surface of the internal electrode. Ferroelectric pellets of $BaTiO_3$ are filled between the external electrode and the hydrogen separating/transporting section.

Patent Document 2 discloses a hydrogen generating apparatus including a plasma reactor, a high-voltage electrode, and a grounding electrode. In the hydrogen generating apparatus of Patent Document 2 a hydrogen separation membrane functions as the high-voltage electrode, and hydrogen is generated by causing a dielectric barrier discharge between the hydrogen separation membrane and the grounding electrode under normal temperature and atmospheric conditions to transform the ammonia contained in the supplied gas into plasma.

A characteristic of the hydrogen generating apparatuses using plasma discharge of Patent Documents 1 and 2 was that the required electrical power for transforming source gas in the cylindrical reactor into plasma in a uniform manner increased along with the capacity of the reactor. Larger reactors could therefore actually be less energy efficient than smaller ones, and there was therefore a risk of a reduced hydrogen yield when large-scale production of hydrogen was necessary.

PRIOR ART DOCUMENTS

Patent Document 1: Japanese Unexamined Patent Application Publication No. 2004-359508.
Patent Document 2: Japanese Unexamined Patent Application Publication No. 2014-70012.

SUMMARY OF THE INVENTION

Problem to be Solved by the Invention

The present invention was made in view of the aforementioned circumstances, and has an object of providing a hydrogen generating apparatus that can flexibly adapt to changes in the amount of hydrogen to be supplied, particularly being capable of adapting to large-scale production of hydrogen and of generating hydrogen of a high purity at a high yield.

Means for Solving the Problem

The hydrogen generating apparatus according to an embodiment of the present invention includes a dielectric body, a grounding electrode, a hydrogen flow channel plate, a hydrogen separation membrane, and a high-voltage power supply. The dielectric body according to the embodiment of the present invention is a tabular dielectric body with a first surface having a source gas flow channel formed as a recess, and a second surface approximately parallel relative to the first surface. The grounding electrode according to the embodiment of the present invention faces the second surface of the dielectric body. The hydrogen flow channel plate according to the embodiment of the present invention includes a hydrogen flow channel and a hydrogen outlet, and is arranged on the first surface side of the dielectric body. The hydrogen separation membrane according to the embodiment of the present invention is arranged between the source gas flow channel and the hydrogen flow channel of the hydrogen flow channel plate, and demarcates the source gas flow channel and the hydrogen flow channel. The high-voltage power supply according to the embodiment of the present invention is configured to cause an electric discharge in the source gas flow channel between the hydrogen separation membrane and the grounding electrode, and is connected to the hydrogen separation membrane. The hydrogen separation membrane according to the embodiment of the present invention is characterized in that it allows hydrogen generated from the source gas by electric discharge in the source gas flow channel pass through into the hydrogen flow channel in the hydrogen flow channel plate.

The source gas of the hydrogen generating apparatus according to the embodiment of the present invention is preferably ammonia.

Preferably, the source gas flow channel is a groove in the form of a plurality of channel sections extending in straight or curved lines and a plurality of return channel sections extending back from the channel sections, the channel sections and return channel sections being alternately connected, and the hydrogen separation membrane is arranged facing the first surface of the dielectric body so as to seal the opening of the source gas flow channel groove.

A hydrogen generating apparatus according to another embodiment of the present invention includes a dielectric body, a high-voltage electrode, a hydrogen flow channel plate, a hydrogen separation membrane, and a high-voltage power supply. The dielectric body according to the embodiment of the present invention is a tabular dielectric body with a first surface having a source gas flow channel formed as a recess, and a second surface approximately parallel relative to the first surface. The high-voltage electrode according to the embodiment of the present invention faces the second surface of the dielectric body. The hydrogen flow channel plate according to the embodiment of the present invention includes a hydrogen flow channel and a hydrogen outlet, and is arranged on the first surface side of the dielectric body. The hydrogen separation membrane according to the embodiment of the present invention is arranged between the source gas flow channel and the hydrogen flow channel of the hydrogen flow channel plate, and demarcates the source gas flow channel and the hydrogen flow channel. The high-voltage power supply according to the embodiment of the present invention is configured to cause an electric discharge in the source gas flow channel between the hydrogen separation membrane and the high-voltage electrode, and is connected to the high-voltage electrode. The hydrogen separation membrane according to the embodiment of the present invention is characterized in that it allows hydrogen generated from the source gas by electric discharge in the source gas flow channel to pass through into the hydrogen flow channel in the hydrogen flow channel plate.

Effects of the Invention

With the hydrogen separation membrane arranged between the source gas flow channel and the hydrogen flow channel, the hydrogen generating apparatus according to the embodiment of the present invention is capable of transforming source gas into plasma in a uniform manner by causing an electric discharge in the source gas flow channel located between the hydrogen separation membrane and the electrode. Moreover, the hydrogen generated by plasma transformation in the source gas flow channel passes through the hydrogen separation membrane and is directly introduced into the hydrogen flow channel. It is therefore possible to efficiently decompose the source gas into hydrogen and separate the generated hydrogen from the source gas to generate hydrogen at a high yield.

In the hydrogen generating apparatus according to the embodiment of the present invention, the source gas flow channel is a groove in the form of a plurality of channel sections extending in a straight or a curved line and a plurality of return channel sections extending back from the channel sections, the channel sections and return channel sections being connected alternating with one another, and the hydrogen separation membrane is arranged facing the first surface of the dielectric body so as to seal the opening of the source gas flow channel groove. This way, the electric discharge between the hydrogen separation membrane and the electrode will occur transverse to the flow direction of the source gas. As a result, it is possible to supply electric power to the source gas in the hydrogen flow channel for a long time, such that the source gas can be transformed into plasma in a uniform manner more efficiently.

In the hydrogen generating apparatus according to the embodiment of the present invention, the tabular dielectric body, the electrode, the hydrogen flow channel plate, and the hydrogen separation membrane can be integrated into a single module. Combining several hydrogen generating apparatuses according to the embodiment of the present invention in parallel allows for flexible handling of changes in the amount of hydrogen to be supplied, and also eases conditions for suitable places of installation.

Depending on the required amount of hydrogen to be generated, the dielectric body of the hydrogen generating apparatus according to the embodiment of the present invention can be easily be modified, possible modifications including the cross-sectional shape of the recess constituting the source gas flow channel, the total length of the source gas flow channel, the source gas flow channel's contact surface with the hydrogen separation membrane, the supply rate of the source gas, and the like.

DESCRIPTION OF THE EMBODIMENTS

Figure 1:
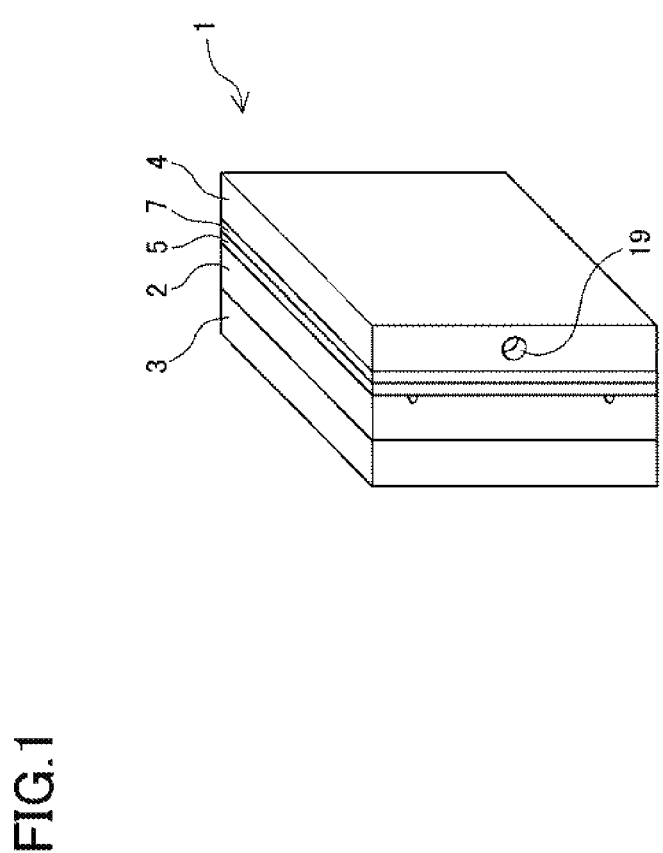
FIG. 1 is a schematic perspective view of the hydrogen generating apparatus according to an example of the present invention.

A preferred embodiment of the present invention is described below.

(1) The source gas used in the hydrogen generating apparatus is preferably ammonia, urea, or a hydrocarbon gas such as methane.

(2) The hydrogen separation membrane, when connected to the high-voltage power supply, functions as a high-voltage electrode. Conversely, when the hydrogen separation membrane is grounded, it functions as a grounding electrode.

(3) When the hydrogen separation membrane functions as a high-voltage electrode, the electrode arranged facing the second surface of the dielectric body functions as a grounding electrode. At this time, an insulating spacer is arranged between the hydrogen separation membrane and the hydrogen flow channel plate.

(4) When the hydrogen separation membrane functions as a grounding electrode, the electrode arranged facing the second surface of the dielectric body functions as a high-voltage electrode. At this time, the insulating spacer is arranged outside of the high-voltage electrode.

(5) The high-voltage electrode and the grounding electrode face each other across the dielectric body, and transform source gas in the source gas flow channel into atmospheric pressure non-equilibrium plasma through dielectric barrier discharge. The high-voltage power supply applies a bipolar pulse waveform to the high-voltage electrode.

(6) The dielectric body is formed of glass such as quartz glass, a ceramic such as alumina, or a highly insulating resin such as barium titanate, polycarbonate, or acryl.

(7) The source gas flow channel is formed in the first surface of the dielectric body, and consists of a plurality of channel sections extending in straight lines parallel to the top surface or side surface of the dielectric body and a plurality of return channel sections extending back from the channel sections, the channel sections and return channel sections being alternately connected.

(8) The source gas flow channel is formed in the first surface of the dielectric body, and consists of a plurality of channel sections extending at an angle relative to the top surface or side surface of the dielectric body and a plurality of return channel sections extending back in hairpin turns at an angle relative to the channel sections, the channel sections and return channel sections being alternately connected.

(9) The source gas flow channel is formed in the first surface of the dielectric body, and consists of a plurality of channel sections extending in curves or arcs, and a plurality of return channel sections extending back from the channel sections, the channel sections and return channel sections being alternately connected such that the channel as a whole runs in a zig-zag pattern.

(10) The source gas flow channel is in the form of a groove with a first side open, and the hydrogen separation membrane is arranged so as to cover and seal this opening. The hydrogen separation membrane has an effective area equal to or greater than the first surface of the dielectric body, and faces the first surface of the dielectric body.

EXAMPLES

Example 1

Figure 2:
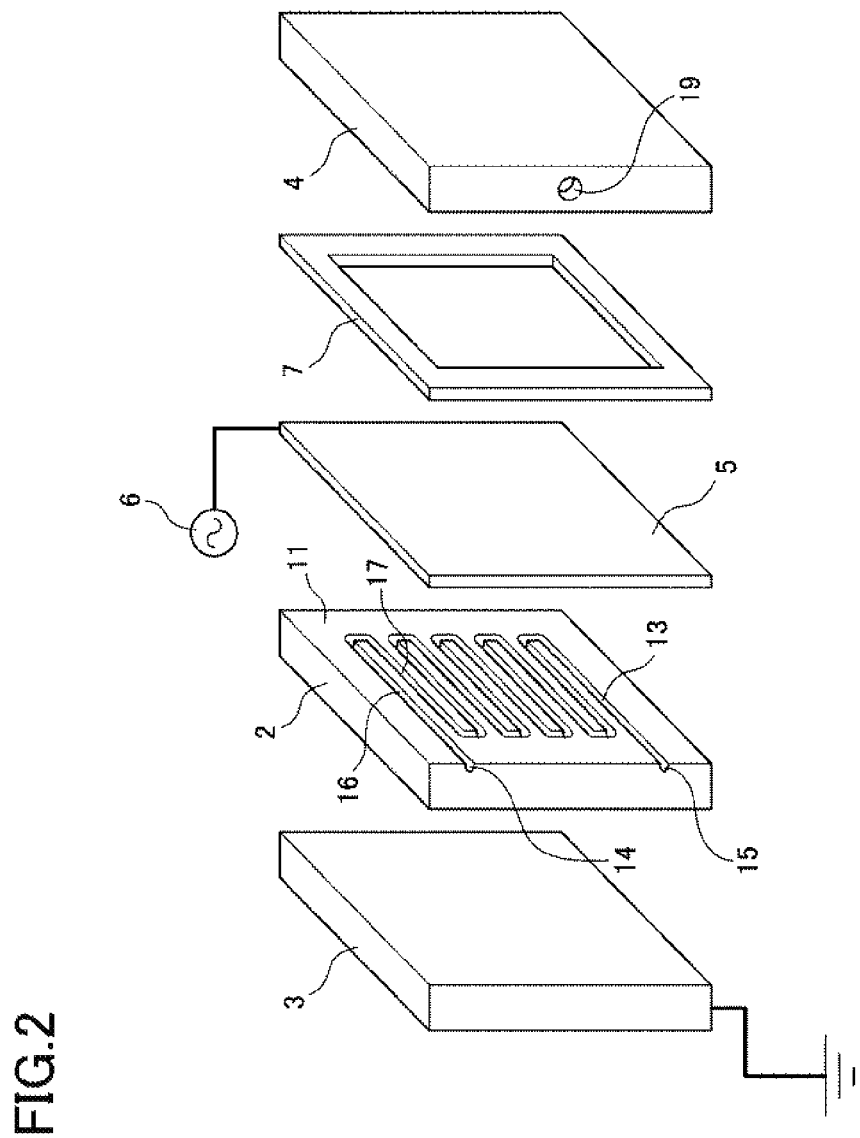
FIG. 2 is an exploded perspective view of the hydrogen generating apparatus according to an example of the present invention.
Figure 3:
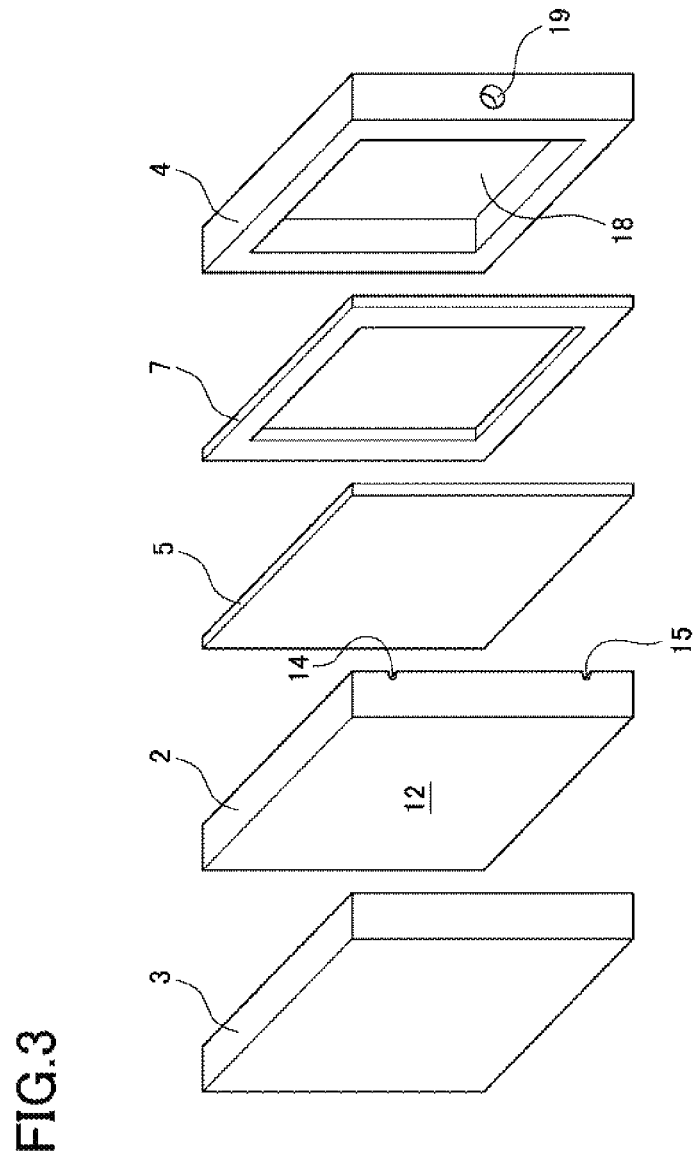
FIG. 3 is an exploded perspective view of the hydrogen generating apparatus according to an example of the present invention.

A preferred example of the hydrogen generating apparatus according to the present invention is described below with reference to the drawings. FIG. 1 is a schematic perspective view of the hydrogen generating apparatus 1 according to the present example. FIG. 2 is an exploded perspective view of the front, top, and right faces of the elements of the hydrogen generating apparatus 1. FIG. 3 is an exploded view of the front, top, and left faces of the elements of the hydrogen generating apparatus 1. The hydrogen generating apparatus 1 includes a dielectric body 2, an electrode 3, a hydrogen flow channel plate 4, a hydrogen separation membrane 5, a high-voltage power supply 6, and an insulating spacer 7. In the following descriptions, the surfaces of the elements shown on the right side of FIGS. 1 to 4 will be referred to as the right side surfaces. The right side surface of the dielectric body 2 corresponds to a first surface 11 of the dielectric body 2. Likewise, the surfaces of the elements shown on the left side in FIGS. 1 to 4 will be referred to as the left side surfaces. The left side surface of the dielectric body 2 corresponds to a second surface 12 of the dielectric body 2.

The dielectric body 2 is made of quartz glass and has the first surface 11 in which there is formed a source gas flow channel 13, and the second surface 12 that is approximately parallel relative to the first surface 11. The source gas flow channel 13 is formed as a recess open at the right side surface in the first surface 11 of the dielectric body 2. The shape of the source gas flow channel 13 can be decided with consideration to the flow rate of the source gas and the voltage to be applied to the source gas. FIG. 2 shows an example in which the source gas flow channel 13 has a channel section 16 that is in communication with a source gas flow channel inlet 14 and extends linearly parallel to the top surface of the dielectric body 2, and a return channel section 17 which extends back parallel to the channel section 16. A plurality of these channel sections 16 and return channel sections 17 are alternately connected at a uniform distance.

The electrode 3 is a tabular electrode arranged so as to face the second surface 12 of the dielectric body 2. In the present example, the electrode 3 is grounded, and functions as a grounding electrode.

The hydrogen flow channel plate 4 is a tabular member including a hydrogen flow channel 18 open to the left side surface, and a hydrogen outlet 19 open to the front surface. When the hydrogen flow channel 18 of the hydrogen flow channel plate 4 is arranged on the first surface 11 side of the dielectric body 2, it is always arranged such that it is open at a location facing the source gas flow channel 13 of the dielectric body 2. FIG. 3 shows an aspect of the hydrogen flow channel 18. By making the hydrogen flow channel plate 4 in the form of a rectangular box, the left side surface of which is entirely open apart from the edges, the hydrogen flow channel 18 is formed such that there will always be an opening at a location facing the source gas flow channel 13.

The hydrogen separation membrane 5 is arranged between the opening of the source gas flow channel 13 of the dielectric body 2 and the hydrogen flow channel 18 of the hydrogen flow channel plate 4, demarcating the source gas flow channel 13 and the hydrogen flow channel 18. In the present example, the hydrogen separation membrane 5 is arranged parallel to the flow direction of the source gas in the source gas flow channel 13 so as to cover the right side surface opening of the source gas flow channel 13, whereby a wall surface having the closed cross-section of the source gas flow channel 13 is defined by the dielectric body 2 and the hydrogen separation membrane 5. Meanwhile, the hydrogen separation membrane 5 covers the opening of the hydrogen flow channel 18, whereby a wall surface having the closed cross-section of the hydrogen flow channel 18 is defined by the hydrogen flow channel plate 4 and the hydrogen separation membrane 5. The hydrogen separation membrane 5 transmits only hydrogen generated from source gas in the source gas flow channel 13 and introduces the hydrogen into the hydrogen flow channel 18.

The hydrogen separation membrane 5 may be formed as a palladium alloy film, a zirconium-nickel (Zr—Ni) alloy film, a vanadium-nickel (V—Ni) alloy film, a niobium-nickel (Nb—Ni) alloy film, or a film consisting of an alloy of one or more metals of the group consisting of niobium (Nb), nickel (Ni), cobalt (Co), and molybdenum (Mo) with one or more metals of the group consisting of vanadium (V), titanium (Ti), zirconium (Zr), tantalum (Ta), and hafnium (Hf). For the hydrogen separation membrane 5 in the present example a palladium alloy film may particularly preferably be used. The hydrogen separation membrane 5 may be formed as a single layer film consisting of the aforementioned metals, or a laminate of two or more metals selected from the aforementioned metals. It is also possible to use a non-metallic hydrogen separation membrane such as a silica-based film, a zeolite-based film, a polyamide-based film, or a polysulfone-based film, but in such case a sturdier supporting medium is bonded to the hydrogen separation membrane 5, and the supporting medium is sandwiched between the dielectric body 2 and the hydrogen flow channel plate 4 to securely demarcate the source gas flow channel 13 and the hydrogen flow channel 18.

The high-voltage power supply 6 is configured to cause an electric discharge in the source gas flow channel 13 between the hydrogen separation membrane 5 and the electrode 3. In the present example, the high-voltage power supply 6 is connected and applies a high voltage to the hydrogen separation membrane 5, causing the hydrogen separation membrane 5 to function as a high-voltage electrode. The insulating spacer 7 is arranged between the hydrogen separation membrane 5 and the hydrogen flow channel plate 4. The high-voltage power supply 6 applies an extremely short bipolar pulse waveform with a retention time (TO) of 10 μs which enables a high electronic energy density.

The dielectric body 2, electrode 3, hydrogen flow channel plate 4, and hydrogen separation membrane 5 that constitute the hydrogen generating apparatus 1 may be configured in rectangular shapes with generally identical height and depth measurements, giving the hydrogen generating apparatus 1 an approximately cuboidal shape. The elements of such a hydrogen generating apparatus 1 may be stacked in this manner and then coupled firmly together using nuts and bolts. In cases where it is especially necessary to seal the source gas flow channel 13 and hydrogen flow channel 18 to ensure airtightness, gaskets or sealants may be additionally provided.

In the hydrogen generating apparatus 1 according to the present example, ammonia is most preferably used as the raw material. The reaction formula when using ammonia as the raw material to generate hydrogen is as shown in Formula 1 below.

$$2NH_3 + e \rightarrow N_2 + 3H_2 + e \quad \text{(Formula 1)}$$

A method for generating hydrogen with the hydrogen generating apparatus 1 using ammonia as the source gas will now be described. A raw material feed means (not shown) includes a flow velocity control means that controls the flow velocity of the source gas, whereby source gas is fed via the source gas flow channel inlet 14 of the dielectric body 2 to the source gas flow channel 13 at a predetermined velocity. The high-voltage power supply 6 applies a voltage to the electrode 3 to cause dielectric barrier discharge between the hydrogen separation membrane 5 and the electrode 3. This discharge transforms the ammonia in the source gas flow channel 13 into atmospheric pressure non-equilibrium plasma. The hydrogen generated from the atmospheric pressure non-equilibrium plasma is adsorbed by the hydrogen separation membrane 5 in the form of hydrogen atoms, which scatter as they pass through the hydrogen separation membrane 5 until they reach the hydrogen flow channel 18 of the hydrogen flow channel plate 4, where they recombine into hydrogen molecules. In this way, the hydrogen separation membrane 5 allows only hydrogen to pass through to the hydrogen flow channel 18, thereby separating the hydrogen.

Through sufficient control of the flow velocity of the ammonia flowing through the source gas flow channel 13, time for the ammonia to be exposed to electric discharge can be secured, making it possible to separate almost 100% of the hydrogen contained in the ammonia and guide the hydrogen into the hydrogen flow channel 18. Since the obtained hydrogen-containing gas has a purity of at least 99.999%, it can be used in a fuel cell as is.

Moreover, the hydrogen generating apparatus 1 according to the present example operates in room temperature, and the generated high-purity hydrogen-containing gas discharged from the hydrogen outlet 19 is also at room temperature. The hydrogen-containing gas can be introduced into a fuel cell as is, without the need for any specific cooling treatment. The hydrogen generating apparatus 1 according to the present example can therefore, for example, be directly connected to a fuel cell operating in room temperature to generate hydrogen.

Figure 4:
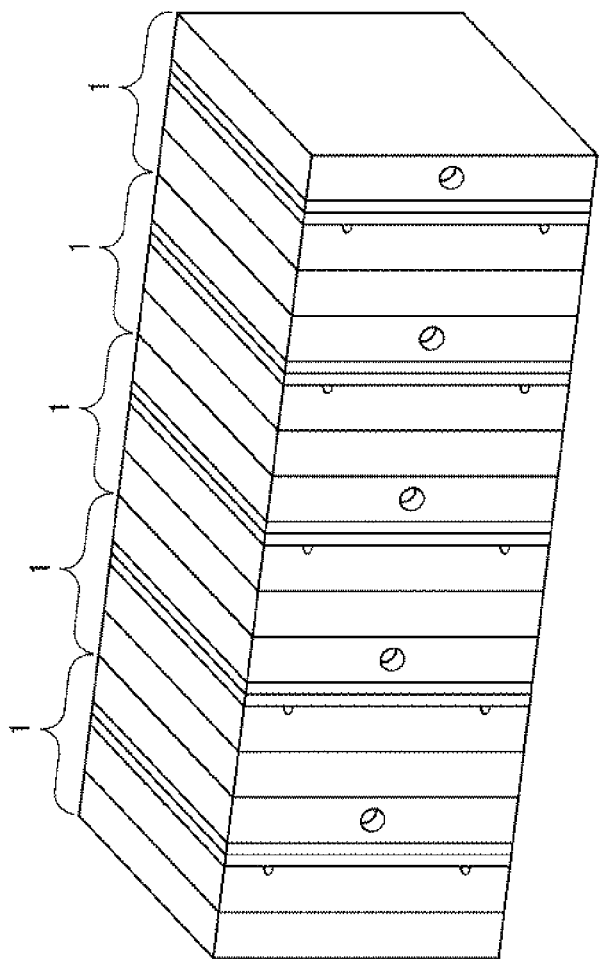
FIG. 4 is a schematic perspective view of a combination in parallel of several hydrogen generating apparatuses according to an example of the present invention.

FIG. 4 shows an arrangement of five hydrogen generating apparatuses 1 according to the present example combined in parallel. By simultaneously feeding source gas to each of the hydrogen generating apparatuses 1, each hydrogen generating apparatus 1 can generate hydrogen of a high purity at a high yield. In addition, by controlling the number of hydrogen generating apparatuses 1 to which source gas is fed, it is possible to easily control the amount of hydrogen generated. Further, since each hydrogen generating apparatus 1 is approximately cuboidal in shape, there is plenty of leeway for stacking and side-by-side positioning, making it easy to change the overall shape of the arrangement.

Figure 5:
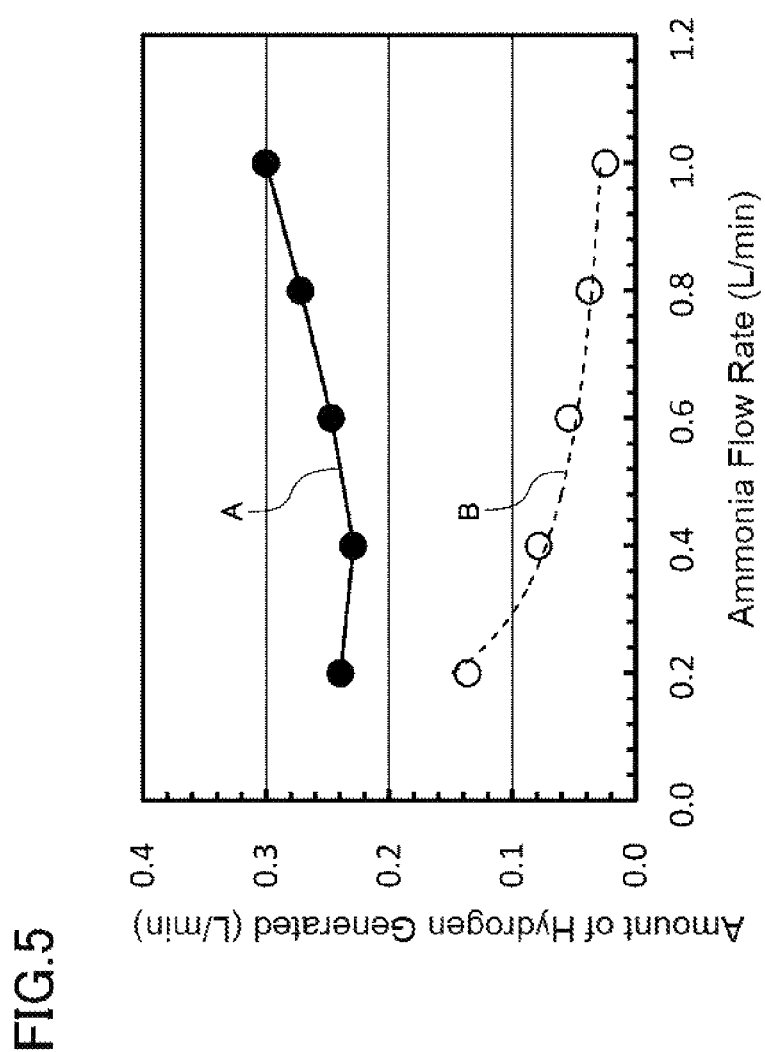
FIG. 5 shows the difference in amount of hydrogen generated relative to the flow rate of ammonia gas in the hydrogen generating apparatus according to the present invention compared to a conventional example.

FIG. 5 is a graph showing the change in the amount of hydrogen generated relative to the amount of ammonia fed into the hydrogen generating apparatus 1. The amount of hydrogen generated is the flow rate at the hydrogen outlet 19 of the hydrogen flow channel plate 4. The change in amount of hydrogen generated by the hydrogen generating apparatus 1 is indicated by the solid line A. For comparison, the amount of hydrogen generated by feeding ammonia to a cylindrical hydrogen generating apparatus 31 under identical conditions is indicated by the dashed line B. The purity of the hydrogen generated by either hydrogen generating apparatus was 99.999%, which is very high. On the other hand, it is obvious from FIG. 5 that regardless of the flow rate of the ammonia, the hydrogen generating apparatus 1 according to the embodiment of the present invention was capable of generating hydrogen at a higher yield than the conventional apparatus, and the amount of hydrogen generated even increased as the feed amount of ammonia increased.

Figure 8:
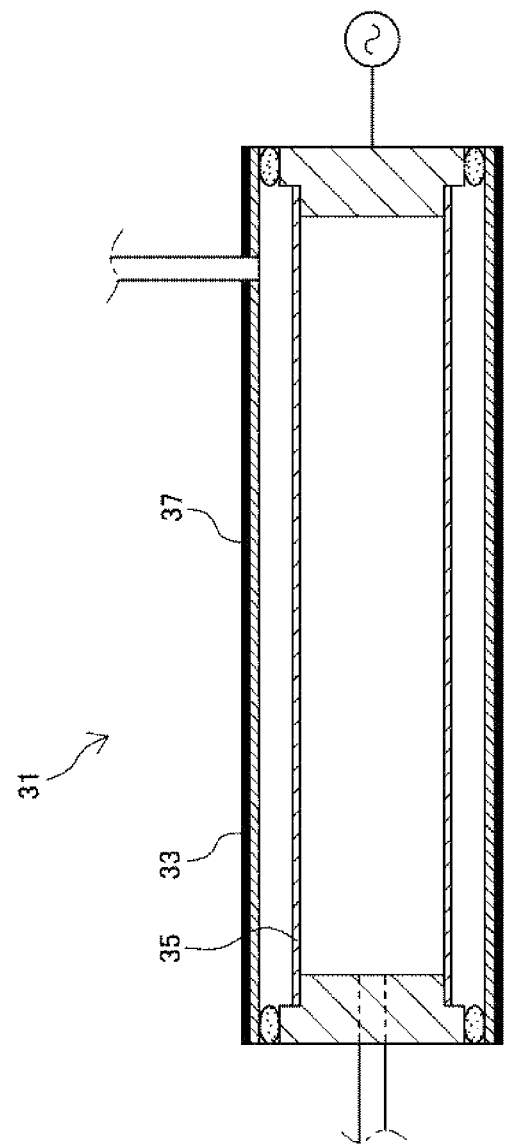
FIG. 8 is a vertical cross-sectional view of a conventional cylindrical hydrogen generating apparatus.

The cylindrical hydrogen generating apparatus 31 shown as a conventional example in FIG. 8 is a plasma reformer including a plasma reactor 33, a high-voltage electrode 35 housed inside the plasma reactor 33, and a grounding electrode 37 arranged in contact with the outside of the plasma reactor 33. In the cylindrical hydrogen generating apparatus 31 the high-voltage electrode 35 is composed of a hydrogen separation membrane which separates and introduces generated hydrogen into the space inside the apparatus.

Example 2

Figure 6:
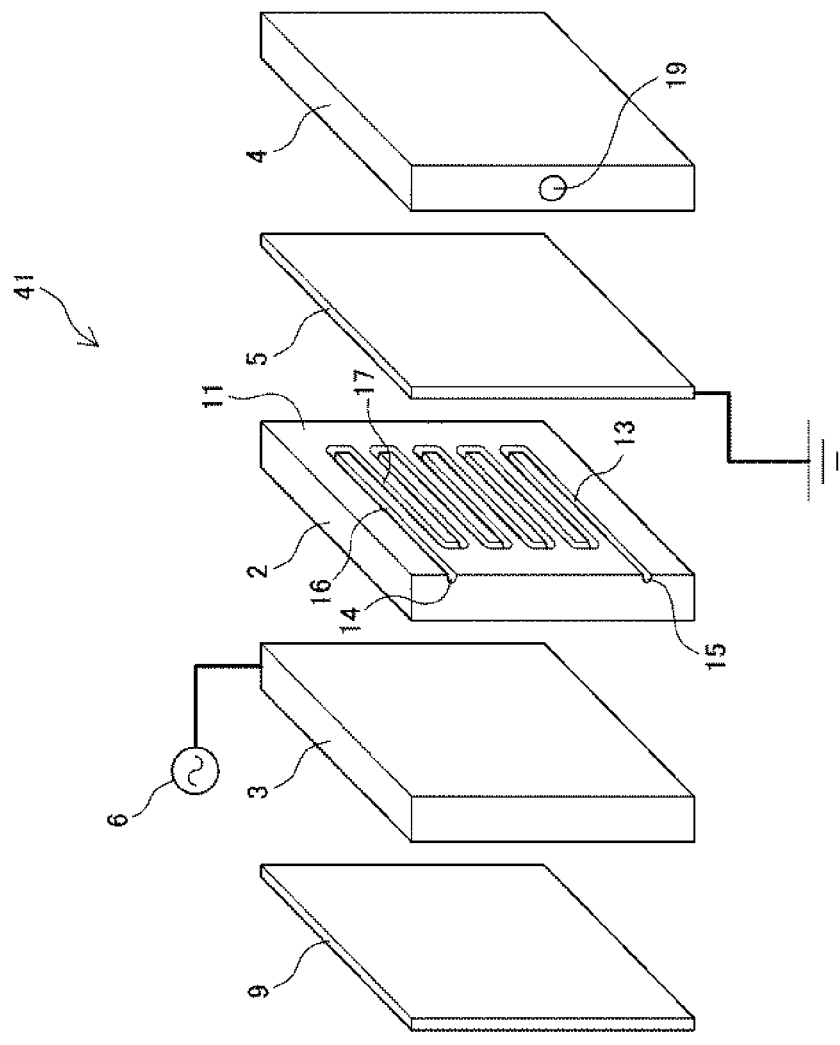
FIG. 6 is an exploded perspective view of a hydrogen generating apparatus according to another example of the present invention.

FIG. 6 shows a hydrogen generating apparatus 41 according to the present example. In the hydrogen generating apparatus 41, the hydrogen separation membrane 5 is grounded and functions as a grounding electrode. Meanwhile, the electrode 3 is connected to the high-voltage power supply 6 and functions as a high-voltage electrode. An insulating spacer 9 is arranged on the outside of the electrode 3. In the present example, the high-voltage power supply 6 applies a voltage to the electrode 3 to cause dielectric barrier discharge in the source gas flow channel 13 between the hydrogen separation membrane 5 and the electrode 3. This discharge transforms the ammonia in the source gas flow channel 13 into atmospheric pressure non-equilibrium plasma, making it possible to generate hydrogen at a high yield and separate it as high-purity hydrogen by the hydrogen separation membrane 5 for supplying to an external device.

Example 3

Figure 7:
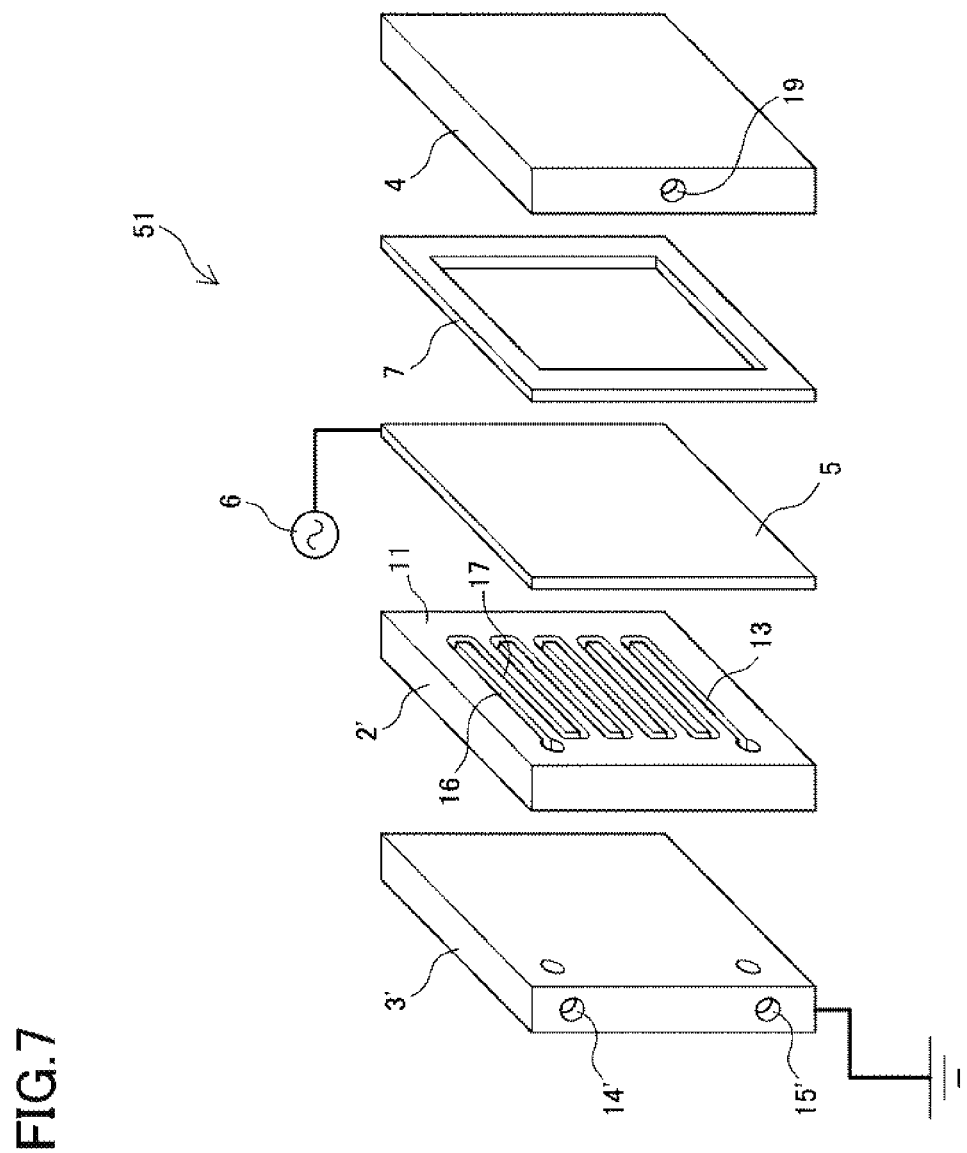
FIG. 7 is an exploded perspective view of the hydrogen generating apparatus according to the other example of the present invention.

FIG. 7 shows a hydrogen generating apparatus 51 according to the present example. The hydrogen generating apparatus 51 is characterized in that the source gas flow channel 13 is formed to pass through both the dielectric body 2' and the electrode 3'. All other configurations are identical to those of the hydrogen generating apparatus 1. The start- and endpoints of the source gas flow channel 13 on the side of the dielectric body 2' pass through the dielectric body 2', and are open on the second surface. On the side of the electrode 3', there are provided on the front surface of the electrode 3' a source gas flow channel inlet 14' and a source gas flow channel outlet 15' which connect respectively to the start- and endpoints of the source gas flow channel 13 on the side of the dielectric body 2'. The configuration of the hydrogen generating apparatus 51 according to the present example is preferably applied to a particularly thin dielectric body 2'.

The configurations of the hydrogen generating apparatuses 1, 41, and 51 described in the Examples can be varied as necessary. The position and shape of the source gas flow channel 13 formed on the dielectric body can be altered within the scope in which an electric discharge can be effected within the source gas flow channel 13. For example, the channel may be formed in the first surface 11 of the dielectric body 2 by a channel section extending at an angle relative to the top surface or side surface and a return section that extends back in a hairpin turn at an angle relative to the channel section, with a plurality of these channel sections and return channel sections being alternately connected. Alternatively, the source gas flow channel 13 may be formed in the first surface of the dielectric body by a plurality of channel sections extending in curves or arcs, and a plurality of return channel sections extending back from the channel sections, the channel sections and return channel sections being alternately connected such that the channel as a whole runs in a zig-zag pattern. The hydrogen flow channel of the hydrogen flow channel plate may also be formed as a groove corresponding to the pattern of the source gas flow channel.

DESCRIPTION OF THE REFERENCE NUMERALS 1, 41, 51 hydrogen generating apparatus
2, 2' dielectric body
3, 3' electrode
4 hydrogen flow channel plate
5 hydrogen separation membrane
6 high-voltage power supply
7, 9 insulating spacer
11 first surface
12 second surface
13 source gas flow channel
14, 14' source gas flow channel inlet
15, 15' source gas flow channel outlet
16 channel section of the source gas flow channel
17 return channel section of the source gas flow channel
18 hydrogen flow channel
19 hydrogen outlet
31 cylindrical hydrogen generating apparatus
33 plasma reactor
35 high-voltage electrode
37 grounding electrode

What is claimed is:

1. A hydrogen generating apparatus comprising:
a tabular dielectric body having a first surface in which a source gas flow channel is formed as a recess, and a second surface that is approximately parallel relative to the first surface;
a grounding electrode facing the second surface of the dielectric body;
a hydrogen flow channel plate including a hydrogen flow channel and a hydrogen outlet, the hydrogen flow channel plate being arranged on a first surface side of the dielectric body;
a hydrogen separation membrane arranged between the source gas flow channel of the dielectric body and the hydrogen flow channel of the hydrogen flow channel plate, the hydrogen separation membrane demarcating the source gas flow channel and the hydrogen flow channel; and
a power supply configured to cause electric discharge in the source gas flow channel between the hydrogen separation membrane and the grounding electrode, the power supply being connected to the hydrogen separation membrane,
wherein the hydrogen separation membrane is configured to transmit hydrogen generated from the source gas in the source gas flow channel by the electric discharge into the hydrogen flow channel of the hydrogen flow channel plate,
wherein the source gas flow channel is one continuous groove comprising channel sections extending in straight or curved lines and return channel sections extending back from the channel sections, the channel sections and return channel sections being alternately connected, and wherein the hydrogen separation membrane is arranged facing the first surface of the dielectric body so as to seal an opening of the source gas flow channel.

2. The hydrogen generating apparatus according to claim 1, wherein the source gas is ammonia.

3. A hydrogen generating apparatus comprising:
a tabular dielectric body having a first surface in which a source gas flow channel is formed as a recess, and a second surface that is approximately parallel relative to the first surface;
an electrode facing the second surface of the dielectric body;
a hydrogen flow channel plate including a hydrogen flow channel and a hydrogen outlet, the hydrogen flow channel plate being arranged on a first surface side of the dielectric body;
a hydrogen separation membrane arranged between the source gas flow channel of the dielectric body and the hydrogen flow channel of the hydrogen flow channel plate, the hydrogen separation membrane demarcating the source gas flow channel and the hydrogen flow channel; and
a power supply configured to cause electric discharge in the source gas flow channel between the hydrogen separation membrane and the electrode, the power supply being connected to the electrode, wherein the hydrogen separation membrane is configured to transmit hydrogen generated from the source gas in the source gas flow channel by the electric discharge into the hydrogen flow channel of the hydrogen flow channel plate, wherein the source gas flow channel is one continuous groove comprising channel sections extending in straight or curved lines and return channel sections extending back from the channel sections, the channel sections and return channel sections being alternately connected, and wherein the hydrogen separation membrane is arranged facing the first surface of the dielectric body so as to seal an opening of the source gas flow channel.

* * * * *